Feb. 4, 1930.  W. T. HONISS  1,745,762
MAGNETIC FLOAT VALVE
Filed Dec. 10, 1928
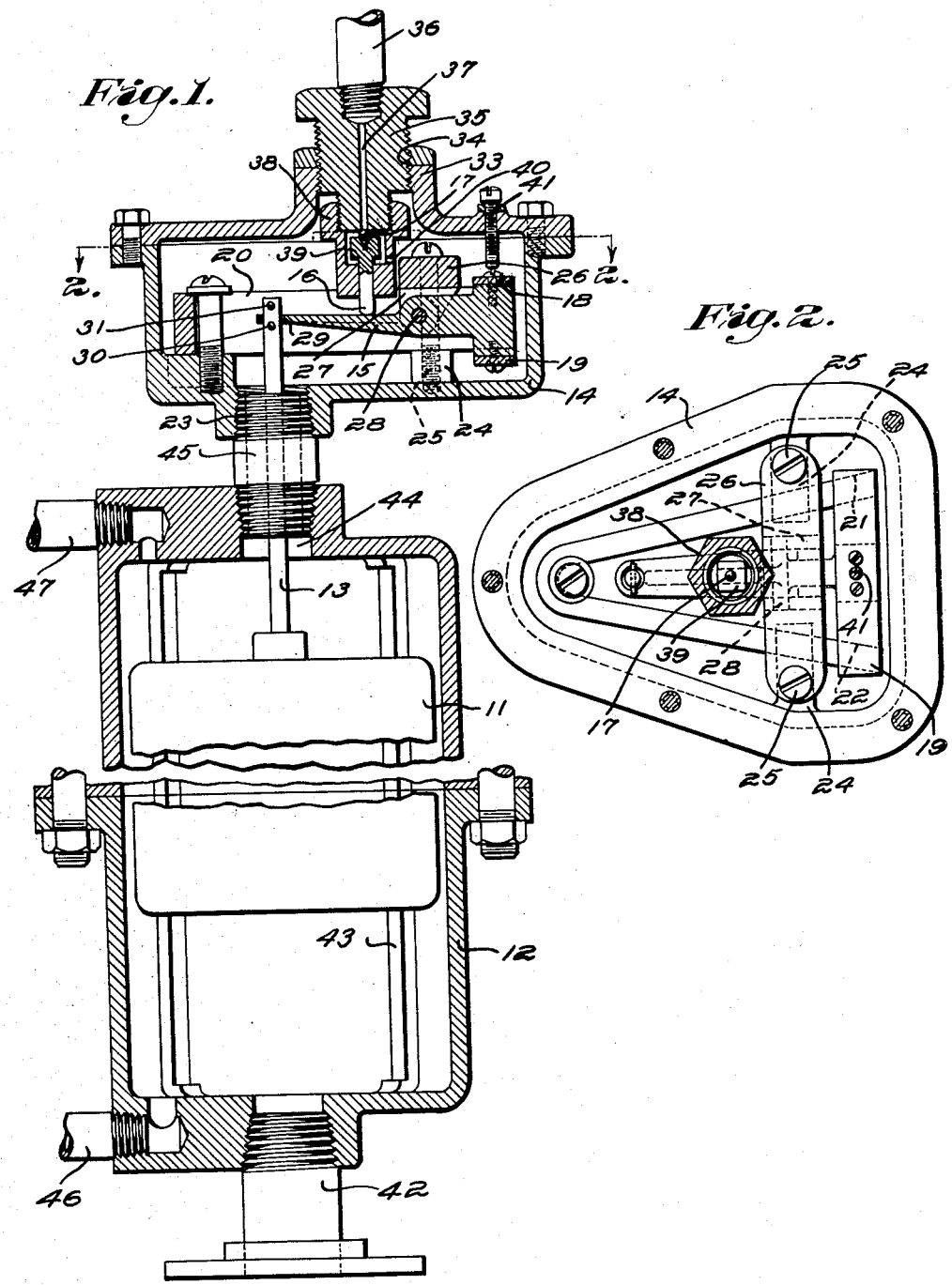
Witness:
Winslow B. Thayer
Inventor:
William T. Honiss
by Robert A. Brown
Attorney Patented Feb. 4, 1930

1,745,762

UNITED STATES PATENT OFFICE

WILLIAM T. HONISS, OF WEST HARTFORD, CONNECTICUT, ASSIGNOR TO HARTFORD-EMPIRE COMPANY, OF HARTFORD, CONNECTICUT, A CORPORATION OF DELAWARE

MAGNETIC FLOAT VALVE

Application filed December 10, 1928. Serial No. 325,103.

My invention relates to float valves and to a quick throw means for positively and quickly opening and closing such valves. I provide a system by which the pull of a magnet is utilized to positively and quickly open and close the valve, the pull of the magnet being controlled by the rise and fall of a float in a float chamber. My invention is especially applicable to an oil burner system, but may be used in any case in which a quick opening and closing float valve is desired.

In float valves of the ordinary type there is a danger that the valve may become clogged, particularly when the flow is small and the valve is being maintained in a nearly closed position. Sometimes this clogging manifests itself only in a restriction of the flow. Sometimes however, by reason of the lodgment of small particles in the seating surfaces the valve is caused to remain away from the seat so that the supply is never fully cut off, and thus there is caused the overflow of the float chamber due to the fact that the float valve is prevented from being perfectly seated even though the liquid level in the float chamber continues to rise. With a float valve which is at times only partly closed the structure is also subject to the danger of a destruction of the valve seating surfaces by "wire drawing" caused by the extremely swift passage of the liquid through the small opening.

One object of this invention is to provide positive means for practically instantaneously opening and closing a valve. A further object is to provide a device which may be used with oil burner systems to control the level of oil within a chamber and at the same time prevent the oil or particles of foreign matter therein from clogging or otherwise interfering with the action of the valve which controls the said oil level and thus prevent overflowing and other bad results. A further object is to prevent the destruction of the valve seating surfaces as by "wire drawing." Further objects are to provide magnetic means to accomplish through a lever connection the practically instantaneous operation of the valve and to provide means to adjust the distance of the nearest approach of separate elements of the magnetic means in order to vary the degree of the effective magnetic pull upon the lever. A further object of my invention is to provide a novel float valve of simple and economical construction which will provide reliable and efficient control of the liquid level in a container.

Other novel features of my invention will appear in the following specification and claims.

I have illustrated one embodiment of the mechanical features of my invention in the accompanying drawing in which:

Figure 1 is a section in elevation, showing my improved float chamber and float, the valve chamber, the valve and the magnetic valve operating means.

Fig. 2 is a horizontal section showing the valve and the magnetic valve operating means, taken on the line 2—2 of Figure 1 and looking in the direction of the arrows.

In the general operation of this embodiment of my invention, liquid fuel is allowed to flow through a valve and a valve chamber into a float chamber. The rise and fall of the level in the float chamber raises and lowers a float, and an upwardly projecting rod connected thereto. This rod has a lost motion connection at its upper end with a lever which bears upon the stem of the valve and moves the valve in response to variation of the level in the float chamber. Armatures fastened to the end of the lever opposite the said rod are attracted by a magnet to urge quickly the lever to one or the other of its extreme positions and thus positively to move the valve either to its fully open or fully closed position.

Referring particularly to the figures of the accompanying drawing, a float 11 within a float chamber 12 has connected to its upper end a rod 13. The upper end of this rod 13 extends into the valve casing 14 and is connected through a lost motion connection with a lever 15 which bears upon the valve stem 16 of a ball valve 17. The lever 15 has attached to the end opposite the connection with the rod 13, a pair of armature plates 18 and 19. The armatures are placed parallel to each other being attached respectively to the upper and lower faces of the lever and extend beyond the sides of the lever 15. A horseshoe magnet 20 is inserted in the valve chamber and has its ends 21 and 22 between the armatures 18 and 19 so that the magnetic field between the said ends tends to urge the nearer of the two armatures toward the magnet. All parts of the apparatus adjacent the magnet 20 are preferably constructed of non-magnetic materials such as brass or bronze.

The valve casing 14 is formed with a threaded opening 23 through which oil passes into the float chamber 12 and through which the connecting rod 13 extends. The valve chamber also carries within the interior thereof two upwardly projecting lugs 24. Screws 25 are employed to fasten to these lugs a transverse cross bar 26, carrying intermediate its end two downwardly projecting ears 27. A pivot pin 28 passes through the ears and through the lever 15 to form the pivot for the said lever. The end of the lever 15 which is connected to the rod 13 is formed with a slot 29 near the said end and the rod 13 extends through the slot and has two spaced pins 30 and 31 one on each side of the said slot, by means of which a lost motion connection is provided between the said rod and the lever.

The cover 33 of the valve casing 14 is provided with an annular upturned flange through which a threaded opening 34 extends. A plug 35 is externally threaded and screwed into this opening and has at its upper end a recess threaded to receive an oil supply pipe 36 through which pipe oil is supplied under pressure. A bore 37 extends centrally and vertically through the plug 35 and terminates at its lower end in a valve seat for the ball valve 17. The lower portion of the plug 35 is reduced and formed with an external screw thread upon which the fitting or valve housing 38 is screwed. The fitting 38 is provided with a small chamber in which the enlarged head of the valve stem 16 reciprocates. This enlarged head carries at its upper end the ball valve 17 and is adapted as it reciprocates within the small chamber to raise the ball valve into its seat at the lower end of the bore 37 or to lower the ball valve away from that seat to allow oil to flow through the bore to the small chamber and out through the outlet 40 into the interior of the valve casing 14. A bore through the lower part of the fitting 38 allows the lower end of the valve stem 16 to reciprocate as it is urged by the lever 15 and thus to reciprocate the enlarged portion 39 and the ball valve 17.

The cover 33 is provided with a small opening through which is threaded the adjusting screw 41. This screw 41 is provided with a lock nut and is adapted to be raised or lowered to control the upward movement of the armature end of the lever 15 and thus controls the nearness of the approach of the lower armature 19 to the magnet 20. The plug 35 may be screwed into or out of the opening 34 in the flange of the cover 33 in order to adjust the seat of the ball valve 17 and thus adjust the nearness of the approach of the upper armature 18 to the magnet 20. Thus by means of these adjustments the effective strength of the pull of the magnet may be varied in order to secure the maximum pull to positively close or open the valve and yet to insure that the valve will not stick open or closed when the float has been raised or lowered respectively. The adjustment of the screw 41 and of the plug 35 is such that there is always a small clearance between the armature plate 18 and the ends 21 and 22 of the magnet 20 and always a small clearance between the armature plate 19 and said ends.

The float chamber 12 may be of any desired construction. It is illustrated in the embodiment shown as having a support 42 and carrying interior rods 43 by which the float 11 is guided. It has an opening 44 at the top, into which a nipple 45 is threaded. The nipple is threaded at its upper end into the lower opening 23 of the valve chamber. An outlet pipe 46 is threaded into the lower end of the float chamber and conveys the fuel oil to the burner or other device to be supplied. A pipe 47 is threaded into the upper end of the float chamber and supplies air at a pressure greater than atmospheric, but less than the pressure of the oil in pipe 36.

In the operation of the device, oil under pressure is introduced through the pipe 36 into the float chamber 12. When the level in the chamber is below the desired level the float 11 and the rod 13 are lowered and raise the armature end of the lever 15 to allow the oil pressure to force down the valve stem 16 and the valve 17. This allows oil to flow through the bore 37, the small chamber in the fitting 38 and through the outlet 40 into the valve chamber 14 and then through the nipple 45 into the float chamber 12. As the oil rises in the float chamber 12 it lifts the float 11 and rod 13 and after a short movement thereof the pin 30 bears upon the under side of the lever 15 and tends to move that lever. The pull of the magnet 20 for a time prevents this movement, but as the pressure upward upon the float 11 increases, this pull is overcome and the lever 15 starts to move. As soon as the lever begins its turning movement the pull of the magnet upon the armature 19 is greatly decreased due to the increased distance and the turning rapidly is accelerated. As it turns, the pull of the magnet upon the armature 18 is increased and the lever is accelerated more than before so that the ball valve 17 is urged quickly and positively to its seat and stops the flow of oil. As the level drops, the float 11 drops, the pin 31 is lowered to press against the upper side of the lever 15 to urge the armature end of the lever upward. In a similar manner as that described on the downward movement, the pull on the armature 18 at first opposes this upward movement, but as the lever moves the opposition is decreased and the pull on the armature 19 begins to aid in the upward movement of that end of the lever and allows the quick downward movement of the valve stem 16 to open the valve 17 and allow further oil to flow.

Pressure through the pipe 47 is constant to force oil at a constant rate of speed through the pipe 46. This pressure, however, is less than the pressure under which the oil in the pipe 36 is forced in and thus such pressure does not interfere with the flowing in of oil. However, when the valve 17 is closed the pressure through the pipe 47 is sufficient to maintain constant flow of the oil through the pipe 46.

It is to be understood that the above described embodiment of the invention is for the purpose of illustration only and various changes may be made therein without departing from the spirit and scope of the invention.

I claim as my invention:

1. In a system of supply for oil burners, a float chamber, a float in said chamber, a conduit for supplying oil to the float chamber, a valve in said conduit, and means for opening and closing said valve comprising a permanent magnet, a pair of armatures associated therewith, an operative connection between said armatures and said valve, and means associated with said connection and with said float for moving the armatures relative to the magnet in response to the level of oil in the float chamber, whereby the effect of the permanent magnet upon the armatures is varied and the valve is opened and closed in response to the level of oil in the float chamber.

2. In flow control apparatus, a fluid supply chamber, a valve for controlling the flow to said chamber, and means for positively and quickly opening and closing the said valve, comprising a horseshoe magnet, a pair of armatures arranged to be actuated by the said magnet when in certain positions relative thereto, the said armatures being placed one on each side of the magnet, a carrier on which the armatures are mounted and adapted to move said valve, and means connected to the said carrier for moving the said armatures toward and from said magnet in response to variations in the level of fluid in the supply chamber.

3. In flow control apparatus, a float chamber, a float therein, a valve controlling flow of fluid to the chamber, and means for positively and quickly operating the said valve, comprising a magnet, a pair of armatures associated with the said magnet and arranged on opposite sides thereof, a lever connected with the armatures and with the valve whereby the valve is made responsive to movement of the armatures and connection between the float and the said lever adapted to initiate the movement of the armatures.

4. In flow control apparatus, a valve, means for positively and quickly operating the said valve, comprising a permanent magnet, a pair of armatures associated with said magnet and placed on opposite sides thereof and an operative connection between the armatures and the valve, and means for adjustably limiting the effective pull of the magnet upon each of the armatures.

5. In flow controlling apparatus, a valve, means for positively and quickly opening and closing said valve, comprising a permanent magnet, a pair of armatures associated therewith, and operative connections between the said armatures and said valve, whereby the valve is made responsive to movement of the armatures and adjustable stop means to limit the approach of the armatures to the magnet.

6. In flow control apparatus, a valve, means for positively and quickly moving the valve to open and closed position, means for adjustably limiting the movement of the opening and closing means, and a float also adapted to move the said opening and closing means.

7. In a liquid level control apparatus, a float chamber, a float in said chamber, a valve controlling the inlet of liquid to the chamber, connecting means between said float and said valve whereby raising and lowering of the float is effective to close and open the valve, a pair of armatures connected to said connecting means and a permanent horseshoe magnet having two poles and arranged with the line connecting the poles between the said armatures whereby after opening or closing movement of the valve is begun by the lowering or raising of the float such valve movement is completed by the influence of the magnet upon one of the armatures.

8. In a liquid level control apparatus, a float chamber, a float in said chamber, a valve controlling the inlet of liquid to the chamber, means for opening and closing said valve comprising a permanent horseshoe magnet, a pair of armatures arranged on opposite sides of the magnet and adapted to be alternately moved into and out of certain positions from which they are attracted by the said magnet and connections between said armatures and said valve whereby the valve is made responsive to movement of the armatures and means connecting said float and said connections for moving the armatures into and out of the said positions.

Signed at Hartford, Connecticut, this 6th day of December, 1928.

WILLIAM T. HONISS.